(12) United States Patent
Brown et al.

(10) Patent No.: US 8,743,680 B2
(45) Date of Patent: Jun. 3, 2014

(54) HIERARCHICAL NETWORK FAILURE HANDLING IN A CLUSTERED NODE ENVIRONMENT

(75) Inventors: William B. Brown, Austin, TX (US); David J. Craft, Wimberly, TX (US); Robert K. Gjertsen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 13/209,104

(22) Filed: Aug. 12, 2011

(65) Prior Publication Data

US 2013/0039166 A1  Feb. 14, 2013

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl.
USPC ............ 370/218; 370/221; 709/252; 714/4.2; 714/47.1; 714/48; 714/799

(58) Field of Classification Search
USPC .......................... 370/216–228; 707/623, 634; 709/208–211, 220–221, 252; 714/2, 714/4.1, 4.11, 4.2, 25, 30, 47.1, 48, 799
See application file for complete search history.

(56) References Cited

U.S. PATENT DOCUMENTS 6,889,254 B1 *  5/2005 Chandra et al. ............... 709/224
6,950,833 B2    9/2005 Costello et al.
2004/0205414 A1 * 10/2004 Roselli et al. .................... 714/39
2006/0034203 A1 *  2/2006 Kozu et al. ...................... 370/312
2006/0150018 A1 *  7/2006 Cousin et al. .................... 714/26
2008/0052327 A1 *  2/2008 Buah .............................. 707/204
2009/0006888 A1    1/2009 Bernhard et al.
2011/0069609 A1 *  3/2011 Le Roux et al. ............... 370/221
2012/0182860 A1 *  7/2012 Liu et al. ........................ 370/216
2013/0039166 A1 *  2/2013 Brown et al. .................. 370/216

OTHER PUBLICATIONS

Yang et al.; HMF: High-available Message-passing Framework for Cluster File System; IEEE International Conference on Networking, Architecture, and Storage; 2009; pp. 1-4.
Bafna et al.; Chirayu: A Highly Available Metadata Server for Object Based Storage Cluster File System; IEEE Bombay Section Student Paper & Project Contest; Apr. 2003; pp. 1-6.
Gjertsen et al.; System and Method for Hierarchical Recovery of a Cluster File System; U.S. Appl. No. 13/080,151, filed Apr. 5, 2011.

* cited by examiner

*Primary Examiner* — Benjamin H Elliott, IV
(74) *Attorney, Agent, or Firm* — James L. Baudino

(57) ABSTRACT

According to one aspect of the present disclosure, a method and technique for hierarchical network failure handling in a clustered node environment is disclosed. The method includes: detecting a network failure by a node in a cluster, the cluster having plural nodes arranged in a hierarchy, wherein the network failure is associated with a subordinate node in the hierarchy to the detecting node; communicating the network failure from the detecting node to a superior node in the hierarchy; determining whether the network failure affects nodes higher than the detecting node in the hierarchy; and responsive to determining that the network failure does not affect nodes higher than the detecting node in the hierarchy, the detecting node initiating a protocol to expel the subordinate node from the cluster.

20 Claims, 3 Drawing Sheets

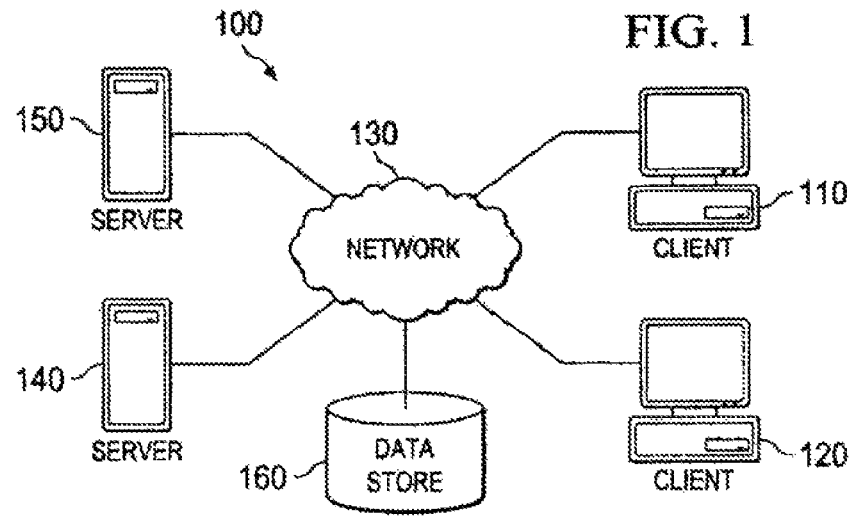
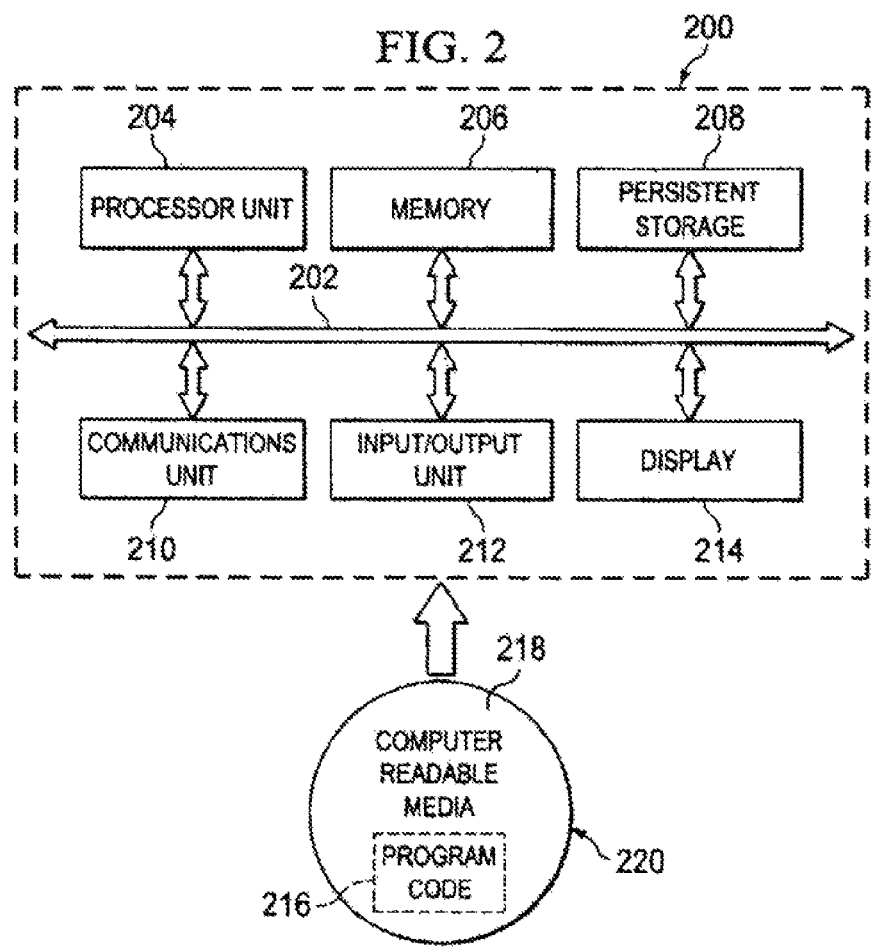

HIERARCHICAL NETWORK FAILURE HANDLING IN A CLUSTERED NODE ENVIRONMENT

BACKGROUND

Distributed computer systems have the capability of sharing resources. "Clustering" generally refers to a computer system organization where multiple computing platforms, or nodes, are networked together to cooperatively perform computer tasks. Different methods are used to handle network events or network failures between nodes in the cluster. These types of network events may be, for example, a total network partition that results when two or more disjoint sets of nodes are unable to communicate with each other while the nodes with a particular set can communicate with each other, or a partial failure that only breaks specific network links between certain nodes.

These types of network failures are generally handled by ensuring that a subset of the cluster nodes can safely continue operation while the other subset of nodes is excluded from the cluster through a containment methodology or protocol. For example, one containment strategy is to only allow a subset of nodes in the majority to operate as cluster members, while the minority subset of nodes discontinue operation (a majority quorum strategy). Variations of this strategy may involve a third party arbitrator in making the decision on which nodes should be excluded from the cluster. Cluster systems that use a storage area network (SAN) utilize the SAN as a secondary control network and have additional flexibility in determining nodes to exclude from the cluster or contain by ensuring that the contained nodes cannot access the SAN. Containment of nodes over a storage area network commonly uses persistent reserve or disk fencing where the contained nodes are disallowed disk access, or alternatively by a voting type of algorithm (e.g., Paxos algorithm) over the SAN that forces the selected nodes to discontinue utilizing the shared storage. The method may also include re-routing communications in an attempt to remedy the network failure. The selection of nodes to exclude from the cluster (or contain) that ensures access to shared resources by those nodes is disallowed may be referred to as an "expel protocol" where the nodes are essentially "expelled" from the cluster.

BRIEF SUMMARY

According to one aspect of the present disclosure a method and technique for hierarchical network failure handling in a clustered node environment is disclosed. The method includes: detecting a network failure by a node in a cluster, the cluster having plural nodes arranged in a hierarchy, wherein the network failure is associated with a subordinate node in the hierarchy to the detecting node; communicating the network failure from the detecting node to a superior node in the hierarchy; determining whether the network failure affects nodes higher than the detecting node in the hierarchy; and responsive to determining that the network failure does not affect nodes higher than the detecting node in the hierarchy, the detecting node initiating a protocol to expel the subordinate node from the cluster.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which:

FIG. 1 is an embodiment of a network of data processing systems in which the illustrative embodiments of the present disclosure may be implemented;

FIG. 2 is an embodiment of a data processing system in which the illustrative embodiments of the present disclosure may be implemented;

DETAILED DESCRIPTION

Figure 3:
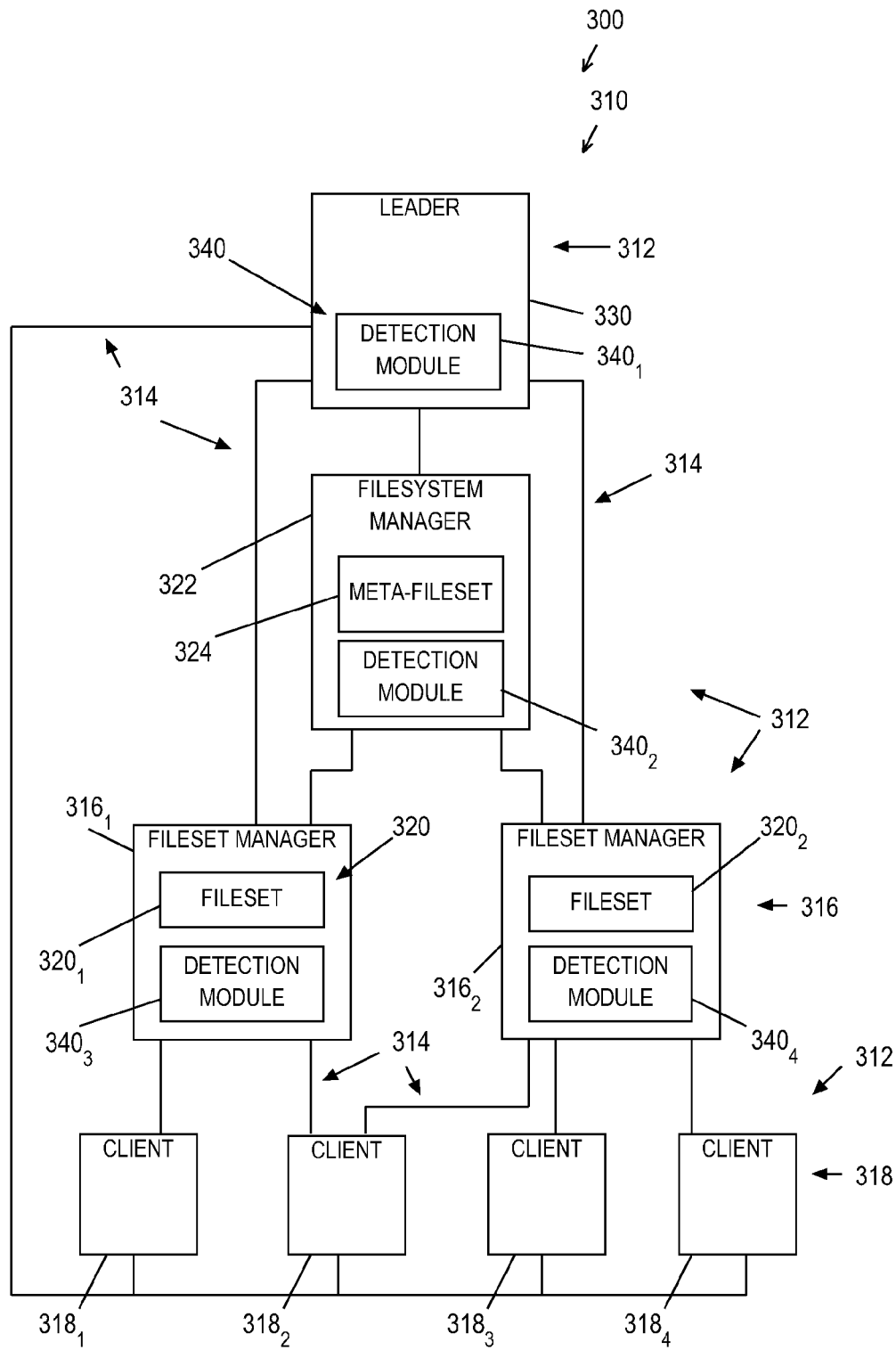
FIG. 3 is a diagram illustrating an embodiment of a data processing system for hierarchical network failure handling in a clustered node environment in which illustrative embodiments of the present disclosure may be implemented.

Embodiments of the present disclosure provide a method, system and computer program product for hierarchical network failure handling in a clustered node environment. For example, in some embodiments, the method and technique includes: detecting a network failure by a node in a cluster, the cluster having plural nodes arranged in a hierarchy, wherein the network failure is associated with a subordinate node in the hierarchy to the detecting node; communicating the network failure from the detecting node to a superior node in the hierarchy; determining whether the network failure affects nodes higher than the detecting node in the hierarchy; and responsive to determining that the network failure does not affect nodes higher than the detecting node in the hierarchy, the detecting node initiating a protocol to expel the subordinate node from the cluster. Embodiments of the present disclosure convey network event information upward through the cluster hierarchy to enable nodes at higher levels in the hierarchy than the detecting node to determine whether the network event is visible to the respective higher level node. If the network event is visible at higher levels of the hierarchy, the highest level node of the hierarchy where the event is visible handles processing of the network event (e.g., by expelling/containing of certain nodes of the cluster and initiating any needed recovery operations). If the network event is not visible to nodes located at higher levels of the hierarchy than the detecting node, the detecting node processes the network event (e.g., by initiating a node expel protocol).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System p® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a data transfer management system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation.

Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

FIG. 3 is an illustrative embodiment of a system 300 for hierarchical network failure handling in a clustered node environment. System 300 may be implemented on data processing systems or platforms such as, but not limited to, servers 140 and/or 150, clients 110 and/or 120, or at other data processing system locations. In the embodiment illustrated in FIG. 3, system 300 includes a cluster 310 having plural computing nodes 312 interfaced with a network 314 and having a hierarchy of node management. In the embodiment of FIG. 3, nodes 312 comprise two fileset managers 316, represented in FIG. 3 as fileset managers $316_1$ and $316_2$, that serve four clients 318, represented in FIG. 3 by clients $318_{1-4}$. In FIG. 3, fileset managers $316_1$ and $316_2$ manage filesets 320, represented by respective filesets $320_1$ and $320_2$, that support client 318 applications that access filesets 320. The filesystem illustrated in system 300 manages "light-weight" sub-filesystems called filesets 320 on each fileset manager 316 node. A fileset may be conceptually analogous to the root directory of a directory tree in that a fileset is the unit of management on a computing node 312, although a single computing node 312 may manage multiple filesets. In FIG. 3, nodes 312 also include a filesystem manager 322 that manages a meta-fileset 324, which is a global fileset of all filesets 320. The hierarchical management of the filesystem is provided with overall management by filesystem 322 and client 318 management by fileset managers 316. In FIG. 3, nodes 312 also include a leader 330 that is a manager of all nodes of cluster 310. Thus, for example, all nodes (e.g., filesystem manager 322, fileset managers 316, and clients 318) are clients of leader 330 to enable leader 330 to direct node recovery for nodes that fail or leave cluster 310 and also that join cluster 310.

In the embodiment illustrated in FIG. 3, leader 330, filesystem manager 322, and fileset managers 316 each include an instance of a detection module 340 (e.g., respective detection modules $340_{1-4}$). Detection module 340 may be implemented in any suitable manner that may be hardware-based, software-based, or some combination of both. For example, detection module 340 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). Detection module 340 is operable to detect a network failure or other network issue between the node it resides on and a node that is lower in the hierarchy (e.g., with respect to a hierarchy of nodes, between a superior node and a subordinate node where the superior node resides at a level of the hierarchy that is higher than the subordinate node). Detection module 340 may detect the network failure by means of a missed heartbeat or expired lease interval (e.g., some quantity of missed heartbeats) that is maintained between the superior node and the subordinate node. For example, referring to FIG. 3, detection module $340_3$ is operable to detect a network failure between fileset manager $316_1$ and each of clients $318_1$ and $318_2$. Thus, at each level of the cluster 310 hierarchy, the superior node maintains a lease with subordinate nodes that are directly below it in the hierarchy (with leader 330 being the exception because leader 330 maintains communication with all nodes of cluster 310 and therefore maintains a lease with all such nodes that is monitored by detection module $340_1$). The lease is generally a fixed interval where the subordinate node must communicate with a superior node in order to have its lease kept current or renewed. The lease expires or lapses if it is not renewed in the fixed lease interval because of a lack of such communication and indicates that a network issue or failure may exist between the superior node and the subordinate node.

Embodiments of the present disclosure enable handling of network failures among a cluster of nodes by using a hierarchical method of expelling nodes that enables the cluster system to continue operation and assures data consistency. For example, in the event of a detection of a network failure in cluster 310 (e.g., by one or more of detection modules 340), the node 312 detecting the failure attempts to communicate upwardly in the hierarchy to enable system 300 to determine whether the same network issue(s) is detected at higher levels of the hierarchy. The upward communication (e.g., performed by detection module 340 or otherwise) may relay the latest statistical information that may be utilized at higher levels in the hierarchy to determine which nodes to expel. Nodes at particular levels of the hierarchy may have information not known at nodes at higher levels in the hierarchy. The statistical information may include which nodes the failure is related to, the filesystems that that were being used or accessed by the relevant node, etc. Information acquired during previous heartbeat communications may also be relayed upward through the hierarchy (e.g., after detection of the network failure or periodically before the detection of a network failure, such as during periodic lease renewal communications).

In some embodiments, at the higher level in the hierarchy, the superior node waits for an additional lease interval to elapse to ensure that additional network failures or information related to the detected network failure in the cluster is acquired before proceeding with a protocol to expel certain nodes from the cluster. For example, a higher level node in the hierarchy may need to arbitrate amongst subordinate nodes so that only one subordinate node performs the expel protocol. By having the higher level node let an additional lease interval elapse before acting, the higher level node will obtain information, if available, regarding multiple subordinate nodes detecting a non-responsive lower level node. In some embodiments, detection module 340 is configured to perform the expel protocol; however, it should be understood that the expel protocol may be otherwise processed (e.g., by a different program, algorithm or component).

In some embodiments, if a network failure is visible or is detected at a higher level node in the hierarchy, the expel protocol is handled or processed at the higher level node (e.g., in some instances, at the highest possible level where the network failure is visible). Otherwise, in the event of a network failure where the loss of a network connection is only visible to lower nodes in the cluster hierarchy, the node expel protocol is managed at a lower level in the hierarchy (e.g., the highest level of the node hierarchy where the problem is apparent).

As an example, referring to FIG. 3, consider a loss of a network connection between fileset manager $316_1$ and client $318_2$ such that fileset manager $316_1$ and client $318_2$ are unable to communicate with each other. The loss of the network connection may be detected by detection module $340_3$ between fileset manager $316_1$ and client $318_2$. Detection module $340_3$ may identify the network event after a lease interval has elapsed and subordinate node client $318_2$ has not renewed its lease with fileset manager $316_1$. In response to detecting the network event, detection module $340_3$ attempts to communicate the network failure to any of its superior nodes in the hierarchy (e.g., filesystem manager 322 and leader 330) to inform the superior nodes of the network problem relative to client $318_2$. In this example, filesystem manager 322 and leader 330 wait for an additional lease interval to elapse to enable the acquisition of network information by filesystem manager 322 and leader 330 to ensure that any network problems visible to filesystem manager 322 and leader 330 are identified (e.g., a lease will expire if a visible network problem exists, otherwise waiting a full lease interval without lease expiry will indicate that the network problem is only visible to nodes lower in the node hierarchy).

If fileset manager $316_1$ is unable to communicate with its superior node(s) or the network failure cannot otherwise be communicated to higher levels in the hierarchy (e.g., to filesystem manager 322 or leader 330), the detecting node (e.g., fileset manager 3160 performs no expel protocol actions so that the expel protocol will be delegated to a higher level node in the hierarchy. If the detecting node is able to convey the network failure up the node hierarchy (e.g., to its superior node or up the entire hierarchy to leader 330), the detecting node awaits information from the higher nodes in the hierarchy as to the action to be taken next. For example, if no network issues are visible higher in the cluster hierarchy, the detecting node may be informed (e.g., by its superior node and/or higher nodes in the hierarchy) that no network issues are visible higher in the cluster hierarchy, and the detecting node may be instructed to process the node expel protocol. Thus, in this example, because the network failure is isolated as being between fileset manager $316_1$ and client $318_2$ (i.e., not visible to higher level nodes in the hierarchy such as leader 330 or filesystem manager 322 because communications between leader 330 and/or filesystem manager 322 with client $318_2$ are unaffected and/or the detected failure does not impact communications with the particular node, such as filesystem manager 322), fileset manager $316_1$ performs the expel protocol to expel client $318_2$ from cluster 310. In some embodiments, detection module 340 of each superior node conveys information to the subordinate node (e.g., fileset manager $316_1$) indicating whether the network failure is visible to the respective superior node and, if not, that the respective superior node will not take any action regarding the node expel protocol. Thus, in some embodiments, in response to receiving an indication from each superior node that the network failure is not visible to the respective superior node, the detecting node processes the expel protocol. In some embodiments, the subordinate detecting node is instructed by a superior node to process the expel protocol (e.g., by leader 330).

In some embodiments, even if no network issues are visible higher in the cluster hierarchy, a higher level node may perform the node expel protocol on behalf of the detecting node to avoid multiple nodes at the same level in the hierarchy that detect the network problem with the same subordinate node from competing and/or deciding to perform the protocol where only one node would be chosen to perform the expel protocol. If network issues are visible higher in the cluster hierarchy, the detecting node (e.g., fileset manager $316_1$) is informed that the network issue is visible to higher levels of the cluster hierarchy and that the expel protocol will be performed by a higher level node (i.e., no expel actions taken by the detecting node).

Various criterion may be used by detection module 340 (at different levels of the hierarchy) to determine which node to perform the expel protocol and which nodes to expel from cluster 310 (e.g., based on the statistical information conveyed through the node hierarchy, the weight assigned to different nodes in the cluster, certain nodes serving as a tie-breaker in a decision to expel certain nodes, etc.). Thus, based on the decision on which node is to perform the expel protocol, the expel protocol is initiated by the designated node and the targeted nodes are forced to relinquish access to any shared resources (or alternatively, have the shared resource made inaccessible to the targeted nodes). Node recovery is then initiated (e.g., by leader 330 or another node) to enable the cluster to resume full operations with remaining nodes in the cluster and/or with additional nodes added to the cluster. In determining which nodes to expel from the cluster, the statistical information may weigh against expelling the subordinate and/or partially isolated nodes, or the statistical information may weigh in favor of expelling the higher level nodes including even leader 330. For example, in some instances, the weighting of a higher level node and nodes it can communicate with may be greater than the few subordinate nodes that are isolated, or perhaps a higher level node and a small subset of nodes it can communicate with is outweighed by the collective importance of the other nodes of the cluster that it can't communicate with. Thus, in some instances, the weighting or other statistical information may dictate that the node detecting the network failure itself be expelled. For instance, consider the example described above where a loss of a network connection between fileset manager $316_1$ and client $318_2$ is detected by fileset manager $316_1$ such that fileset manager $316_1$ and client $318_2$ are unable to communicate with each other while the detected failure is not visible to leader 330 (i.e., leader 330 remains in communication with client $318_2$). The weighting of client $318_2$ may be such that, instead of expelling client $318_2$, fileset manager $316_1$ is expelled. Thus, in some embodiments, information may be passed down through the hierarchy to designate which nodes to expel (e.g., from leader 330 to fileset manager $316_1$).

In some embodiments, even after first detecting a network issue, the detecting node may wait for an additional lease interval to elapse before attempting to communicate the network event to higher levels in the hierarchy to enable the collection of all possible network problems relative to subordinate nodes and/or reduce communications through the hierarchy. In some embodiments, the superior nodes are operable to recognize redundant problem node notifications that can occur up to one lease interval later (e.g., the leader node may have already expelled the problem node such that no further action is needed). Further, in the case where a network partition exists (e.g., two or more disjoint sets of nodes), a higher level node will coordinate the expel protocol. For example, consider a scenario where a network partition exists relative to fileset manager $316_1$, client $318_1$ and client $318_2$ such that fileset manager $316_1$, client $318_1$ and client $318_2$ are isolated from the remaining nodes of cluster 310. Filesystem manager 322 will detect a lost connection to fileset manager $316_1$, and fileset manager $316_2$ will detect a lost network connection to client $318_2$. Filesystem manager 322 will notify leader 330 of the lost network connection to fileset manager $316_1$. Fileset manager $316_2$ will notify filesystem manager 322 and leader 330 of the lost network connection to client $318_2$. Filesystem manager 322 and leader 330 await the expiration of an additional lease interval to enable the acquisition of any lease expirations relative to the lost connections. For example, the expiration of an additional lease interval will ensure that leader 330 detects a lost network connection between leader 330 and each of fileset manager $316_1$, client $318_1$ and client $318_2$. Thus, in this example, the network failure is visible to leader 330 and filesystem manager 322. Therefore, in this example, the highest level node in the hierarchy where the problem is apparent is leader 330, and leader 330 will process the expel protocol. Further, leader 330 (e.g., detection module $340_1$) will notify filesystem manager 322 that the network failure is visible to leader 330 such that filesystem manager 322 does not take any further action.

Figure 4:
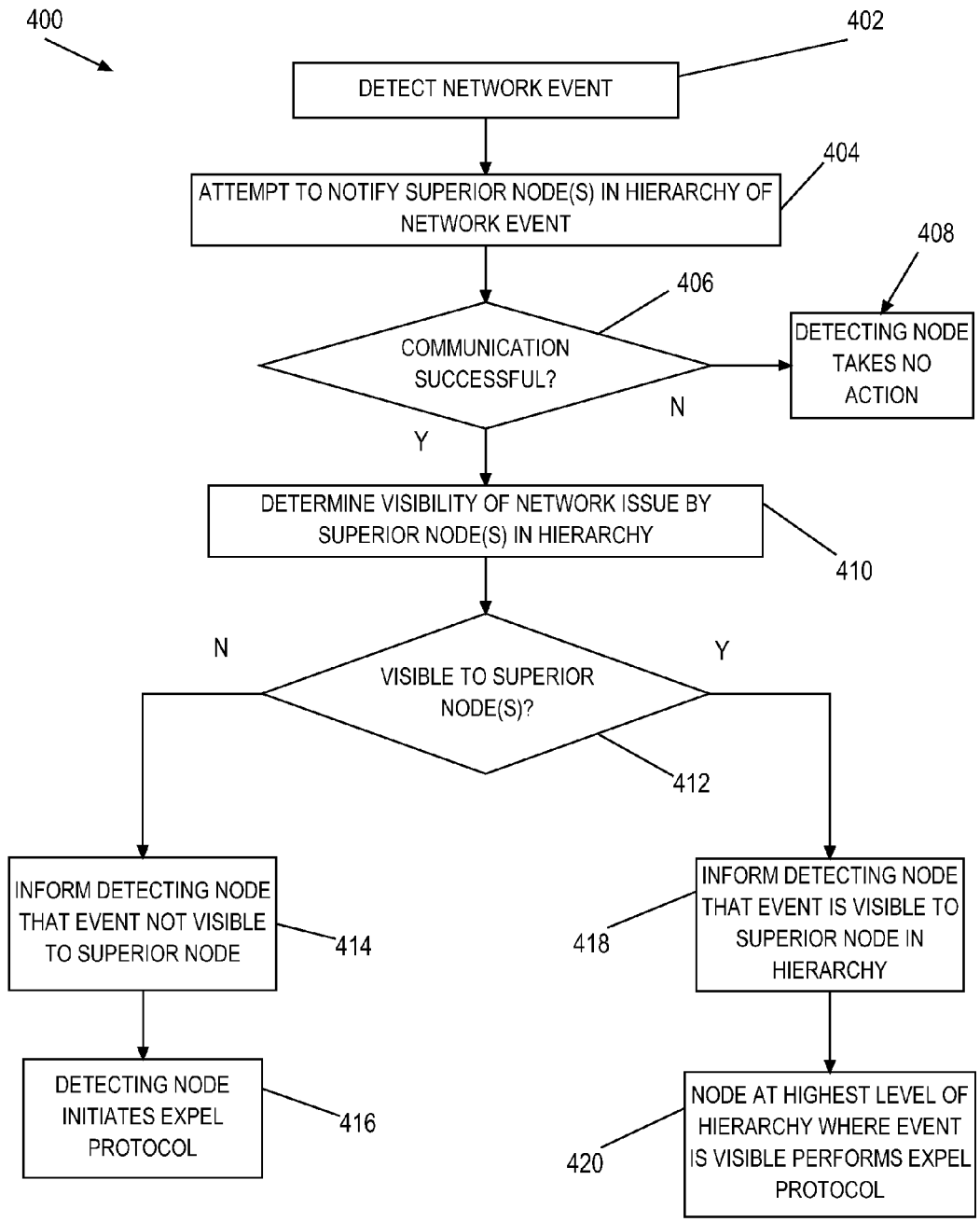
FIG. 4 is a flow diagram illustrating an embodiment of a method for hierarchical network failure handling in a clustered node environment.

FIG. 4 is a flow diagram illustrating an embodiment of a method for hierarchical handling of network failures among a cluster of nodes. The method begins at block 402, where a node detects a network event, such as a lack of a lease renewal by a subordinate node. At block 404, the detecting node attempts to communicate the detection of the network event to any superior nodes of the detecting node. At decisional block 406, a determination is made whether the detecting node was able to communicate the network event to its superior node(s) (e.g., by a respective instance of the detecting nodes detection module 340). If the detecting node was unable to communicate the network event to its superior node(s), the method proceeds to block 408, where the detecting node takes no further action. For example, in this case, the lack of communication from the detecting node to its superior node will be detected by the superior node as a lack of lease renewal by the detecting node, thereby resulting in the detection of a network event by the superior node.

If the detecting node was able to communicate the network event to its superior node(s), the method proceeds to block 410, where a determination is made by the superior nodes as to the visibility of the network event by the superior node. For example, in some embodiments, each superior node of the detecting node awaits at most one additional lease interval to ensure that the superior node detects any lease expirations relative to the detected network event. However, it should be understood that the particular node awaiting to take action until an additional lease interval elapses may vary. For example, in some embodiments, the node detecting a network failure may wait for an additional lease interval to elapse before conveying information regarding the network failure to a superior node (e.g., gathering information regarding any other lease lapses and/or reducing communications through the hierarchy). In other embodiments, the superior node waits for an additional lease interval to elapse before taking action (even if this results in multiple communications being received by the superior node from the detecting node during a lease interval regarding a particular network failure). At decisional block 412, a determination is made whether the network event is visible to the superior node. If not, the method proceeds to block 414, where the superior node informs to the detecting node that the network event is not visible to the respective superior node. At block 416, the detecting node performs a node expel protocol.

If, at decisional block 412, a determination is made that the network event is visible to the superior node, the method proceeds to block 418, where the superior node informs the detecting node that the network event is visible to the superior node. At block 420, the node highest in the hierarchy where the network event is visible initiates the expel protocol.

Thus, embodiments of the present disclosure enable detection and handling of network events that are not visible to all nodes in the cluster to ensure continued operation of the cluster. Further, embodiments of the present disclosure enable globally optimized decisions to be made in determining the best set of nodes to expel from the cluster given that nodes higher in the cluster hierarchy can make more informed decisions based on network event detection conveyed through the hierarchy. Additionally, embodiments of the present disclosure enable the expel protocol to be performed in a coordinated manner at the highest possible level of the hierarchy where the event is visible and avoid situations where nodes are contending with each other to expel certain nodes from the cluster.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for hierarchical network failure handling, comprising:
    detecting a network failure by a node in a cluster, the cluster having plural nodes arranged in a hierarchy, wherein the network failure is associated with a subordinate node in the hierarchy to the detecting node;
    communicating the network failure from the detecting node to a superior node in the hierarchy;
    determining whether the network failure affects nodes higher than the detecting node in the hierarchy; and
    responsive to determining that the network failure does not affect nodes higher than the detecting node in the hierarchy, the detecting node initiating a protocol to expel the subordinate node from the cluster.

2. The method of claim 1, wherein detecting the network failure comprises determining that a lease interval has elapsed without the subordinate node renewing a lease with the detecting node.

3. The method of claim 1, wherein determining whether the network failure affects nodes higher than the detecting node in the hierarchy comprises determining whether a lease has lapsed relative to another node higher than the detecting node in the hierarchy.

4. The method of claim 1, wherein determining whether the network failure affects nodes higher than the detecting node in the hierarchy comprises determining, after expiration of a lease interval, whether a lease has lapsed between the subordinate node and another node higher than the detecting node in the hierarchy.

5. The method of claim 1, further comprising, responsive to determining that the network failure affects nodes higher than the detecting node in the hierarchy, identifying a node higher in the hierarchy than the detecting node to initiate a protocol to expel nodes from the cluster.

6. The method of claim 5, further comprising notifying the detecting node that the protocol to expel nodes from the cluster will be performed by a node higher in the hierarchy than the detecting node.

7. The method of claim 1, wherein determining whether the network failure affects nodes higher than the detecting node in the hierarchy comprises determining, by the superior node, whether the network failure is visible to the superior node, and further comprising:
    responsive to detecting that the network failure is not visible to the superior node, notifying the detecting node that the network failure is not visible to the superior node; and
    responsive to receiving a notification at the detecting node that the network failure is not visible to the superior node, initiating the protocol by the detecting node.

8. A system for hierarchical network failure handling, comprising:
    a cluster having plural nodes arranged in a hierarchy, each node comprising a processor coupled to a memory;
    a first detection module stored on a node in the cluster and operable to detect a network failure associated with a subordinate node in the hierarchy to the detecting node, wherein the first detection module is further operable to communicate the network failure to a superior node in the hierarchy;
    a second detection module stored on the superior node and operable to determine whether the network failure is visible to the superior node; and
    wherein the node detecting the network failure is operable to, responsive to determining that the network failure is not visible to the superior node, initiate a protocol to expel the subordinate node from the cluster.

9. The system of claim 8, wherein the first detection module is operable to detect the network failure based on determining that a lease interval has elapsed without the subordinate node renewing a lease with the detecting node.

10. The system of claim 8, wherein the second detection module is operable to determine whether the network failure is visible to the superior node based on whether a lease has lapsed relative to the superior node and the subordinate node.

11. The system of claim 8, wherein the second detection module is operable to determine whether the network failure is visible to the superior node based on determining, after expiration of a lease interval, whether a lease has lapsed relative to the superior node and the subordinate node.

12. The system of claim 8, wherein the second detection module is operable to, responsive to determining that the network failure is visible to the superior node:
- notify the detecting node that the network failure is visible to the superior node; and
- initiate a protocol to expel nodes from the cluster by the superior node.

13. The system of claim 8, wherein:
- responsive to detecting that the network failure is not visible to the superior node, the superior node notifying the detecting node that the network failure is not visible to the superior node; and
- responsive to receiving a notification at the detecting node that the network failure is not visible to the superior node, initiating the protocol by the detecting node.

14. The system of claim 8, wherein the second detection module is operable to communicate to the first detection module that the network failure is not visible to the superior node.

15. A computer program product for hierarchical network failure handling in a cluster having plural nodes arranged in a hierarchy, the computer program product comprising:
- a computer readable storage device having computer readable program code embodied therewith, the computer readable program code comprising computer readable program code configured to:
  - detect a network failure by a node in the cluster, wherein the network failure is associated with a subordinate node in the hierarchy to the detecting node;
  - communicate the network failure from the detecting node to a superior node in the hierarchy;
  - determine whether the network failure is visible to nodes higher in the hierarchy than the detecting node; and
  - responsive to determining that the network failure does not affect nodes higher than the detecting node in the hierarchy, initiate a protocol by the detecting node to expel the subordinate node from the cluster.

16. The computer program product of claim 15, wherein the computer readable program code is configured to detect the network failure by determining that a lease interval has elapsed without the subordinate node renewing a lease with the detecting node.

17. The computer program product of claim 15, wherein the computer readable program code is configured to determine whether the network failure affects nodes higher than the detecting node in the hierarchy by determining whether a lease has lapsed relative to another node higher than the detecting node in the hierarchy.

18. The computer program product of claim 15, wherein the computer readable program code is configured to, responsive to determining that the network failure affects nodes higher than the detecting node in the hierarchy, identify a node higher in the hierarchy than the detecting node to initiate a protocol to expel nodes from the cluster.

19. The computer program product of claim 18, wherein the computer readable program code is configured to notify the detecting node that the protocol to expel nodes from the cluster will be performed by a node higher in the hierarchy than the detecting node.

20. The computer program product of claim 15, wherein the computer readable program code is configured to determine whether the network failure affects nodes higher than the detecting node in the hierarchy by determining, after expiration of a lease interval, whether a lease has lapsed relative to another node higher than the detecting node in the hierarchy and the subordinate node.

* * * * *